Figure 1:
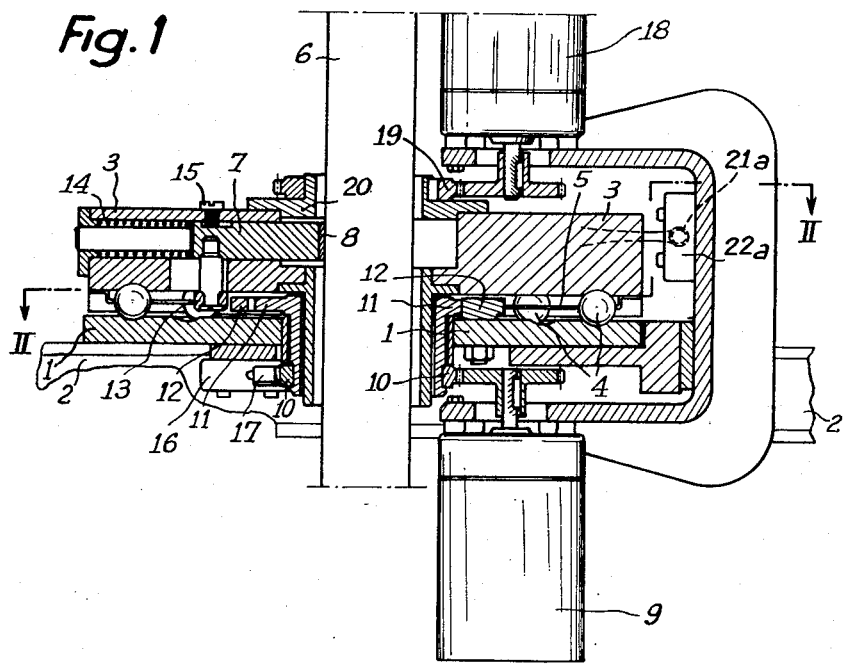

Dec. 12, 1961     J. HAINZELIN ET AL     3,012,791
DRIVING CHUCKS, PARTICULARLY FOR INSPECTING
FUEL ELEMENTS OF NUCLEAR REACTORS
Filed May 19, 1959

INVENTORS
Jean Hainzelin
Jacques Jouin
Claude Prevost
BY Bacon & Thomas ATTORNEYS

United States Patent Office 3,012,791
Patented Dec. 12, 1961

3,012,791
DRIVING CHUCKS, PARTICULARLY FOR INSPECTING FUEL ELEMENTS OF NUCLEAR REACTORS
Jean Hainzelin, Paris, Jacques Jouin, Chaville, and Claude Prevost, Orsay, France, assignors to Commissariat a l'Energie Atomique, Paris, France
Filed May 19, 1959, Ser. No. 814,346
Claims priority, application France May 31, 1958
5 Claims. (Cl. 279—71)

Immediately after their extraction from a nuclear reactor, it is useful to inspect the fuel elements in order to obtain information, in particular concerning the behaviour of the fuel elements and to seek the causes or effects of any incident, such as the breaking of a sheath for example.

This inspection is effected by means of installations comprising apparatus chosen in accordance with the phenomena which it is desired to analyse. When the examination of the elements is for example effected by radiography, an X-ray emitter and an image intensifier-television receiver assembly is used. Whatever the particular type of installation used, in most cases it is necessary, for the purpose of inspection, to displace the elements longitudinally and angularly in order to inspect them completely and to locate the defects on the basis of information defined on one hand as a function of the longitudinal position of the element in the installation and on the other hand as a function of its angular position.

The present invention relates to inspection arrangements in which the element to be inspected, which is for example suspended from a winch, is located and guided in a vertical tube provided with two diametrically opposed observation windows.

The invention has more specifically for an object a driving chuck adapted to grasp the element to be inspected so as to maintain it in a predetermined longitudinal position and then to impart a rotary movement to it and possibly to stop it at predetermined angular positions.

According to the invention there is provided a driving chuck, particularly for apparatus for observing the fuel elements of nuclear reactors, and adapted to grasp the element to be observed so as to maintain it in a predetermined longitudinal position, and then to impart a rotary movement thereto and successively stop it in predetermined angular positions, in which the chuck has a fixed plate on which a movable plate is mounted for rotation, jaws being slidably mounted in said movable plate and being normally resiliently pushed back towards the center of the chuck, and in which operating members are provided to push said jaws back in an outwards direction to define an angular position of the movable plate, and means for rotating said movable plate which means are checked by detecting devices actuated for certain given angular positions of the movable plate.

Figure 2:
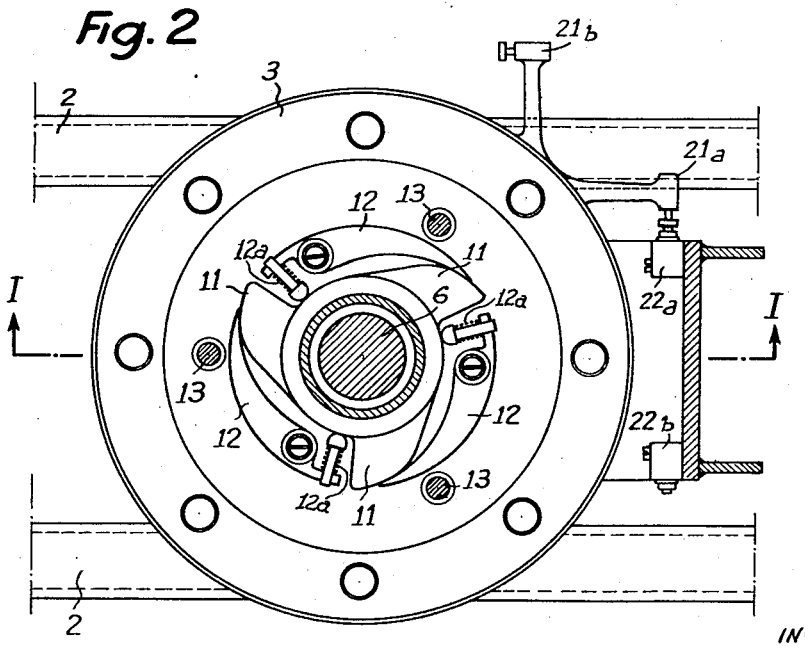

In order that the invention may be more clearly understood, reference will now be made to the accompanying drawings which show one specific embodiment thereof by way of example and in which:

FIGURE 1 shows an axial section through the driving chuck according to the invention along the line I—I of FIG. 2, and FIGURE 2 is a section along II—II of FIGURE 1.

The chuck comprises a fixed part constituted by a plate 1 resting for example on two supports 2 which are themselves sealed across an observation pit (not shown), and a movable part which is rigidly joined to a plate 3 whose rotation on the fixed plate 1 is made possible by means of balls 4 maintained by a cage 5 and rolling in circular grooves provided in plates 1 and 3.

The element 6 (FIGURE 1) is gripped by means of three radially disposed jaws 7 spaced 120° apart and slidably mounted in the movable plate 3. The jaws 7 are provided with a lining 8 for preventing the element from sliding and deteriorating.

A lower electric motor 9 drives a toothed quadrant 10 fixedly mounted on the depending high portion of outwardly extending cams 11. These cams act on three levers 12 which are drawn back by springs 12a and which act on jaws 7 through rollers 13 and thus control the opening and closing of said jaws. The intermediate levers 12 are provided to permit rotation of the chuck assembly while gripping the element as will be explained hereunder. The jaws 7 are brought back into gripping position by means of springs 14. Guide screws 15 prevent the jaws from pivoting on themselves.

Two micro-switches 16 mounted on fixed plate 1 limit the rotation of the cam when they contact thrust blocks 17 which are integral with said cam. As can be seen from FIG. 2 of the drawings, the jaws 7 are released when the plate 3 of the chuck is in the position shown and when the action of the motor 9 causes the cams 11 to rotate counterclockwise relative to the plate 3. When on the contrary the cams 11 have been brought back into their positions such as shown, the jaws, under the action of springs 14, have again gripped the element 6 in longitudinal position adjusted by means of the winch to which element is for instance hooked.

When the element is thus gripped between the jaws 7 and thus held stationary relative to plate 3 of the chuck, rotation of plate 3 and element 6 is then controlled by means of a second motor 18. This motor drives, by means of a drive pinion, a gear 19 fixed on a hub 20 which is fixed to the movable plate 3.

According to the requirements of the installation for observing the fuel elements or bars, the motor 18 will be provided with a control circuit which enables the element under observation to be given any desired succession of defined angular positions. In the example shown it has been supposed that it was desired simply to stop the element at two angular positions 270° apart. For this purpose the movable plate 3 carries spring-loaded thrust members 21a and 21b actuating micro-switches 22a and 22b respectively inserted in the control circuit of the motor 18. In the position of FIGURE 2, the thrust member 21a is in contact with the micro-switch 22a; when the movable plate 3 rotates 270° counter-clockwise from its position in FIG. 2, the thrust member 21b contacts the micro-switch 22b and interrupts the current supply to the motor 18. Obviously if it is desired to stop the element at successive angular positions other than 270° apart, the thrust members and the contacts positioned accordingly.

Although a particularly simple specific embodiment of the invention has been described and shown above in the drawings it should be understood that the latter is not limited to this example which may be given many modifications of detail which do not alter the functional purport of the various constitutive elements.

What we claim is:

1. A driving chuck for use in manipulating nuclear-reactor fuel elements, comprising: a fixed plate; a moveable plate mounted for rotation on said fixed plate, said fixed and moveable plates having coaxial central bores; jaws slidably mounted on said moveable plate; resilient means normally urging said jaws toward the center of said moveable plate; operating members connected with said jaws and operable to move said jaws outwardly against the force of said resilient means; and means for rotating said moveable plate, said rotating means being controlled by detecting means to limit rotation at predetermined points in the path of rotation.

2. A driving chuck as defined in claim 1 wherein said jaws have gripping surfaces at their inner extremities, said surfaces being provided with friction linings, whereby fuel elements received in said central bores are securely gripped.

3. A driving chuck as defined in claim 1 wherein said means for rotating said moveable plates comprises an electric motor controlled by a circuit having switches therein actuated by means on said moveable plate.

4. A driving chuck as defined in claim 1 wherein said operating means comprises rotary cams moveable independently of said moveable plate, each of said cams being positioned to operate one of said jaws through an intermediate lever pivotally mounted on said fixed plate.

5. A driving chuck as defined in claim 4 wherein said cams are rotated by an electric motor controlled by a circuit having switch means therein actuated by means moveable with said cams.

References Cited in the file of this patent
UNITED STATES PATENTS

| | | |
|---|---|---|
| 1,488,221 | Swissgabel | Mar. 25, 1924 |
| 2,300,918 | Herr | Nov. 3, 1942 |